June 3, 1924.  M. BERTSCH  1,496,406
EXPRESSION DOLL
Filed June 8, 1920  2 Sheets-Sheet 1
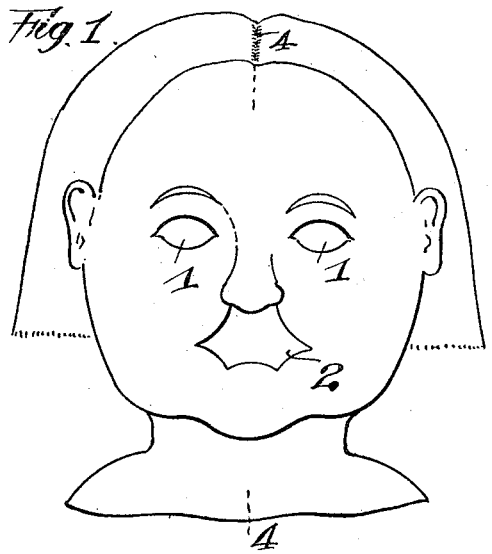
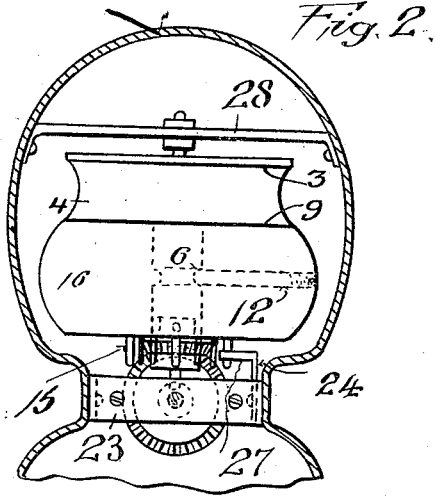
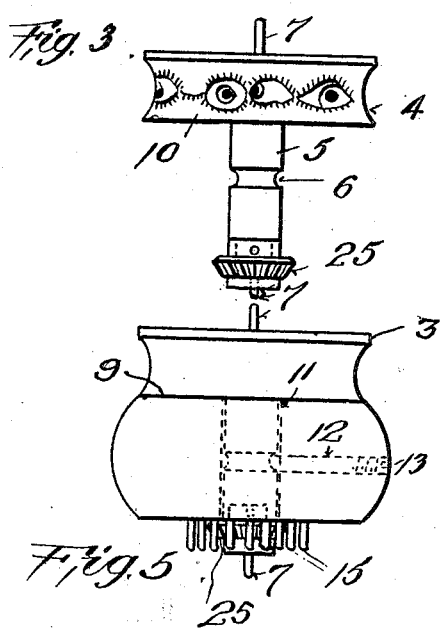
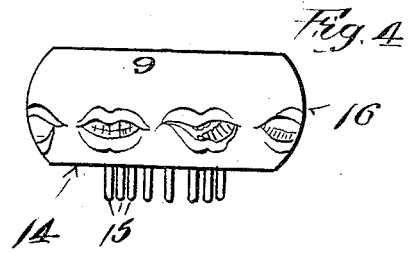
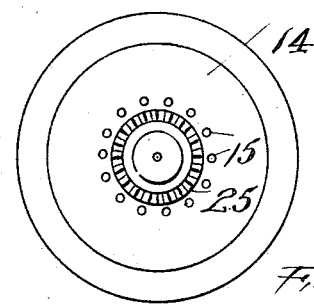
Marguerite Bertsch
Inventor.
Samuel E. Darby
By her Attorney June 3, 1924.

M. BERTSCH

EXPRESSION DOLL

Filed June 8, 1920

Marguerite Bertsch
Inventor
Samuel E. Darby
By her Attorney

Patented June 3, 1924.

1,496,406

UNITED STATES PATENT OFFICE.

MARGUERITE BERTSCH, OF NEW YORK, N. Y.

EXPRESSION DOLL.

Application filed June 8, 1920. Serial No. 387,343.

*To all whom it may concern:*

Be it known that I, MARGUERITE BERTSCH, a citizen of the United States, residing at New York, in the county and State of New York, have invented a new and useful Improvement in Expression Dolls, of which the following is a specification.

The invention relates to expression dolls.

The object of the invention is to provide, in a doll's head, novel means to produce a multiplicity of expressions of the doll's face.

A further object of the invention is to provide certain eye expressions which correspond to certain mouth expressions, denoting joy, anger, fear, sorrow, etc., and means whereby the combined corresponding eye and mouth expressions are successively disposed through apertures in the doll's face.

A further object of the invention is to provide means for automatically changing the eye expression corresponding with its mouth expression, so that said eye expression will register, correspond and be disposed through said apertures in the doll's face with a different mouth expression and thereby allowing a maximum number of expressions to be disposed through said apertures.

A further object of the invention is the provision of a peculiar shaped expression form upon which the eye and mouth expressions are made to appear with the same lines and curves as in the human face.

Further objects of the invention will appear more fully hereinafter.

With the above objects in view the invention consists substantially in the arrangement, combination, construction and relative location of parts, all as will be more fully hereinafter set forth, as shown in the accompanying drawings and pointed out in the appended claims.

Reference is had to the accompanying drawings and the various views and reference signs appearing therein, and wherein, Fig. 1 is a front elevation of the mask of the expression doll showing the apertures cut in the same corresponding to the eye sockets and the natural lines of the face surrounding the mouth.

Fig. 2 is a vertical sectional view of Fig. 1 showing the expression form in place within the doll's head.

Fig. 3 is a front elevation of the upper segment of the expression form.

Fig. 4 is a front elevation of the lower segment of the expression form.

Fig. 5 is a front elevation showing the upper and lower segments of the expression form in position with respect to each other.

Fig. 6 is a bottom plan view of Fig. 5.

Figure 7:
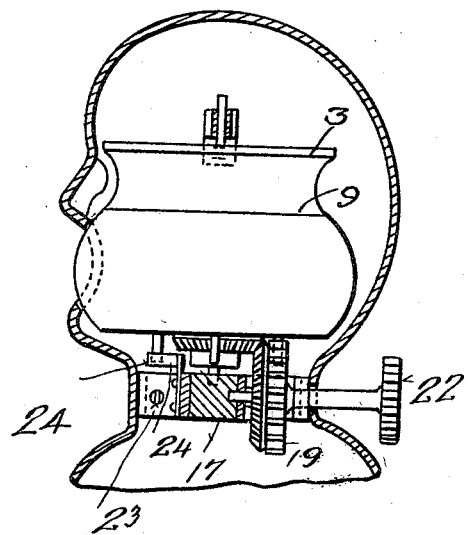
Fig. 7 is a vertical sectional view taken on the line 4—4, Fig. 1, showing a side elevation of the expression form and complete operating mechanism installed.

Referring to the drawings, I provide a mask of a doll's head as shown in Fig. 1 made of any suitable material wherein there is cut out apertures which correspond to the natural lines of the eye sockets indicated at 1, and the natural lines surrounding the mouth, namely, the line under the nose, the lines of the cheeks, and the lines just above the chin, as indicated at 2. This doll's head may be open at the top to permit the insertion of the expression form and mechanism or may be cut in half so that the back of the head may be attached to the face portion after the expression form and mechanism has been put in position.

The expression form illustrated in Figs. 3, 4, and 5, is made of wood or any other suitable material, and is composed of an upper segment shown in Fig. 3 and a lower segment shown in Fig. 4. The particular shape of these segments as shown is the preferred shape to be used in accordance with the objects of my invention because they follow the natural planes of the human eye and the mouth of a conventional face but it is obvious that various other shapes of the expression form may be employed to indicate expressions for other types of faces without departing from the objects and purposes of my invention.

The upper segment is composed of a cylindrical portion 3 having its sides curved inwardly as at 4, or outwardly if desired. On the curved surface the eye expressions are painted or otherwise indicated. The cylinder 3 has a reduced portion 5, which is adapted to be received in, and extend through an aperture 11 in the lower segment. Extending through the upper segment is a pivot pin 7. Integrally attached to the lower end of the upper segment is a serrated disc 25 which is secured to same after the upper and lower segments have been placed into associated position.

The lower segment of the expression form has a flat surface 9 adapted to frictionally engage the under surface 10 of the cylindrical portion 3 of the upper segment and has an aperture 11 extending therethrough adapted to receive the reduced portion 5 of the upper segment. There is also provided in said lower segment an aperture 12 which is at right angles to the aperture 11 and of less diameter than said aperture 11. The aperture 12 registers with the groove 6 in the reduced portion 3 of the upper segment, when the upper and lower segments are in position with each other, and is adapted to receive a pin 13 to frictionally engage the groove 6. The lower surface 14 is flat and is provided with pegs 15 which extend downwardly therefrom. The side portions 16 of the lower segment are curved outwardly and on this outwardly curved surface is painted or otherwise indicated a series of mouth expressions.

Figure 8:
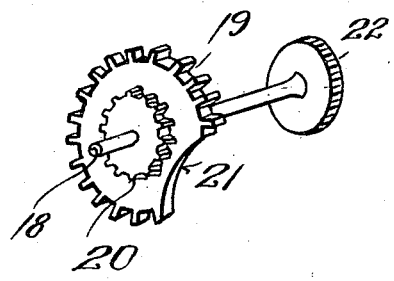
Fig. 8 is a perspective detail view of the operating gear wheels for the expression form.

In the neck or shoulder portion of the doll form there is secured in any suitable manner a supporting member 17 for the expression form. The supporting member forms a bearing for the lower end of the pivot pin 7 and also acts as a support and bearing for the operating mechanism shown in Fig. 8, a hole being provided through the supporting member for receiving the shaft 18 of said operating mechanism.

The operating mechanism comprises a shaft 18 upon which is mounted the gear wheels 19 and 20. The operating mechanism is so placed in respect to the position of the expression form on said supporting member that the gear wheel 19 will engage the downwardly extending pegs 15 of the lower segment and the gear wheel 20 will engage the serrated disc 25 of the upper segment. The gear wheel 19 is cut out one sixth of its circumference as indicated at 21 so that when the gears are revolved, the lower segment of the expression form will not be revolved when the cut out portion comes adjacent the pegs 15 on the lower segment, whereas the upper segment will continue to revolve. The shaft 18 of the operating gear mechanism is extended on one side of the gear wheels so that it may pass through a hole cut in the neck or back of the doll and is provided at its end with a knob or enlarged portion 22 to revolve the gear mechanism.

A bracket 23 is secured to the supporting member 17 to receive the other end of shaft 18 and the end of said shaft is held in position in said brackets and supporting member by a cotter pin or other suitable device.

Attached to the supporting member 17 in any suitable manner is a flexible pin with a portion 27 adapted to engage the pins 15 of the lower segment of the expression form. The object of this flexible pin is to retard the revolving motion of the expression form so that there is a slight hesitation in the revolving motion thereof and also, when it is desired to keep a certain expression exposed through the apertures in the doll mask, to hold said expression in position until the revolving of the expression form is continued.

In the upper portion of the doll's head there is provided a bearing 28 for the upper end of the pivot pin 7 of the expression form. This bearing may consist of a strip of metal or wood screwed to the sides of the head as indicated in Fig. 2 and having means for receiving the pivot pin 7 therein or any other suitable arrangement to act as a bearing for said pivot pin and to hold the expression form in position on its supporting member so that the eye and mouth expressions will register with the cut out portions of the mask.

Figure 9:
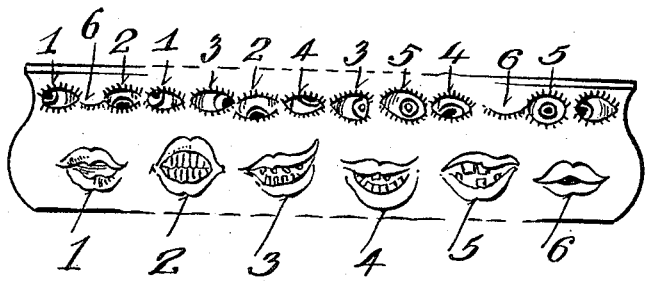
Fig. 9 is a diagrammatic view showing the arrangement of the eye expressions with respect to the mouth expressions on the expression form.

As indicated above, the eye expressions are painted or otherwise indicated on the upper segment of the expression form and the mouth expressions are painted or otherwise indicated on the lower segment. Fig. 9 shows the novel manner of arrangement of the eyes with respect to the mouth expressions. It will be seen that two eye expressions are painted directly over each mouth and these eye expressions are covered by the nose of the mask when the mouth expression is disposed through the mouth aperture in the mask. On either side of the two eye expressions over a particular mouth, the eye expressions that correspond to that particular mouth are located. In Fig. 9 the numbers indicate the positions of the eyes and the mouths that go together in an expression and it will be seen for example that the eyes numbered 2 will register in the eye socket apertures in the mask when the mouth expression numbered 2 registers in the aperture for the mouth. It is obvious that instead of having two eye expressions indicated over each mouth, the number may be varied without departing from the objects of my invention.

The operation of the expression mechanism is as follows:—Revolving the shaft 18 by twirling the knob 22, the gear wheels 19 and 20 engage the pegs and serrations of the two segments of the expression form and revolve the same on its pivot 7. The two segments move together because of the frictional engagement of the pin 13 with the groove 6 of the upper segment. The flexible retarding pin 24 also engages with the pegs 15 as the expression form revolves and checks the revolving motion between expressions. This pin also acts to hold a particular expression in position with the aperture in the mask when it is not desired to change the expression. When six mouth and eye expressions have been exposed the cut out portion of the gear wheel 19 comes adjacent to the downwardly extending pegs 15 of the lower segment and there being no engagement between the gear wheel and the pegs at this point, the lower segment remains stationary, whereas, the upper segment is revolved one set or pair of eye expressions so that when the combined revolution of the two segments continues, a different combination of eye and mouth expressions are paired off with each other and are disclosed accordingly through the apertures in the doll mask. It will be seen by this arrangement of the parts that there can be obtained a multiplicity of expressions which will be the square of the number of mouth expressions indicated on the lower segment. In the illustration of the device I have shown six mouth expressions and six pairs of eyes and therefore there can be produced thirty six different combinations of facial expressions.

The operating mechanism shown in the drawings is simply illustrative of one form to accomplish the purposes desired, and it is obvious that anyone skilled in the art would be able to substitute similar mechanism of different construction which will come within the scope and meaning of my invention. It is also obvious that while I have shown a manually operated mechanism for revolving the expression form, that any motor driven means could be employed to accomplish the same results and I do not wish to be limited in this respect to the exact structure shown and described.

Having now set forth the objects and nature of my invention, and a construction embodying the principles thereof, what I claim as new and useful and of my own invention and desire to secure by Letters Patent, is:—

1. An expression doll, comprising a head having a formed face with cut out portions therein, a revolving expression form mounted within the head comprising upper and lower segments provided with means for independently moving of said segments to thereby produce combinations in expression.

2. An expression doll, comprising a head having a formed face with cut out portions therein, a revolving expression form mounted within the head comprising upper and lower segments and means for simultaneously moving of said segments.

3. An expression doll, comprising a head having a formed face with cut out portions therein, a revolving expression form mounted within the head comprising upper and lower segments and means for independently and simultaneously moving of said segments.

4. An expression doll, comprising a head having a face with cut out portions therein, a revolving expression form mounted within the head comprising upper and lower segments frictionally engaged with each other and provided with means for independent movement of said segments.

5. An expression doll, comprising a head having a face with cut out portions therein, a revolving expression form mounted within the head comprising upper and lower segments, means for frictionally engaging said segments with each other, means for revolving said segments simultaneously and independently.

6. An expression doll comprising a head having a face with cut out portions therein, a revolving expression form having a multiplicity of eye and mouth expressions thereon adapted to register in said cut out portions of said face, said expression form being comprised of an upper and lower segment frictionally engaging with each other, said eye expressions being indicated on said upper segment and said mouth expressions being indicated on said lower segment, the eye expressions being double in number to said mouth expressions, and so arranged on said upper segment that there will be two eye expressions indicated directly over a mouth expression and which two eye expressions will remain hidden by the nose portion of the doll's face when the mouth expression over which they are indicated is disposed through the cut out portion in said face for said mouth, and means for revolving said expression form so as to dispose said eye and mouth expressions through said cut out portions of said face.

7. An expression doll comprising a head having a face with cut out portions therein, a revolving expression form having a multiplicity of eye and mouth expressions thereon adapted to register in said cut out portions of said face, said expression form being comprised of an upper and lower segment frictionally engaging with each other, said eye expressions being indicated on said upper segment and said mouth expressions being indicated on said lower segment, the eye expressions being double in number to said mouth expressions, and so arranged on said upper segment that the two eye expressions corresponding to each mouth expression are separated from each other by two other eye expressions which are indicated directly over said mouth expressions, and means for revolving said segments simultaneously so as to dispose said corresponding eye and mouth expressions through said cut out portions in said face.

8. An expression doll comprising a head having a face with cut out portions therein, a revolving expression form having a multiplicity of eye and mouth expressions thereon adapted to register in said cut out portions of said face, said expression form being comprised of an upper and lower segment frictionally engaging with each other, said eye expressions being indicated on said upper segment and said mouth expressions being indicated on said lower segment, the eye expressions being double in number to said mouth expressions, and so arranged on said upper segment that the two eye expressions corresponding to each mouth expression are separated from each other by two other eye expressions which are indicated directly over said mouth expressions, and means for revolving said upper segment independently of said lower segment so as to change the combination of eye and mouth expressions so that a different combination of expressions will be disposed through the cut out portions of the face.

9. An expression doll, comprising a head having a face with cut out portions therein, a revolving form mounted in the head comprising upper and lower segments, said upper segment comprising a cylinder with inwardly curved sides and a reduced portion adapted to pass through an aperture in said lower segment, said lower segment comprising a cylinder with outwardly curved sides having an aperture extending therethrough adapted to receive the reduced portion of said upper segment, means on the under surface of both upper and lower segments for simultaneous and independent movement thereof.

In testimony whereof I have hereunto set my hand on this 4" day of June, A. D., 1920.

MARGUERITE BERTSCH.